United States Patent
Niemela

(10) Patent No.: US 8,914,889 B2
(45) Date of Patent: Dec. 16, 2014

(54) FALSE ALARM DETECTION FOR MALWARE SCANNING

(75) Inventor: Jarno Niemela, Espoo (FI)

(73) Assignee: F-Secure Corporation, Helsinki (FI)

( * ) Notice: Subject to any disclaimer, the term of this patent is extended or adjusted under 35 U.S.C. 154(b) by 0 days.

(21) Appl. No.: 13/376,862

(22) PCT Filed: May 28, 2010

(86) PCT No.: PCT/EP2010/057474
§ 371 (c)(1),
(2), (4) Date: Dec. 8, 2011

(87) PCT Pub. No.: WO2010/142545
PCT Pub. Date: Dec. 16, 2010

(65) Prior Publication Data
US 2012/0084865 A1    Apr. 5, 2012

(30) Foreign Application Priority Data

Jun. 10, 2009  (GB) .................................. 0909954.0

(51) Int. Cl.
G06F 11/00    (2006.01)
G06F 12/14    (2006.01)
G06F 12/16    (2006.01)
G08B 23/00    (2006.01)
G06F 21/56    (2013.01)

(52) U.S. Cl.
CPC ...... G06F 21/563 (2013.01); *G06F 2221/2111* (2013.01)
USPC .............................................. 726/24; 726/22

(58) Field of Classification Search
CPC ..... G06F 21/56; G06F 21/562; G06F 21/563; G06F 21/566

USPC ............................................................ 726/24
See application file for complete search history.

(56) References Cited

U.S. PATENT DOCUMENTS

| 7,290,282 | B1 |   | 10/2007 | Renert et al. ..................... | 726/24 |
| 8,028,338 | B1 | * | 9/2011 | Schneider et al. ............... | 726/24 |
| 8,166,543 | B2 | * | 4/2012 | Park et al. ........................ | 726/22 |
| 8,239,949 | B2 | * | 8/2012 | Xie .................................. | 726/24 |
| 8,312,548 | B1 | * | 11/2012 | Cnudde et al. .................. | 726/24 |
| 2004/0064736 | A1 | * | 4/2004 | Obrecht et al. ................ | 713/201 |
| 2004/0172551 | A1 |   | 9/2004 | Fielding et al. ................ | 713/200 |
| 2005/0021994 | A1 | * | 1/2005 | Barton et al. .................. | 713/200 |
| 2006/0174345 | A1 | * | 8/2006 | Flanagan et al. ................ | 726/24 |
| 2007/0180528 | A1 | * | 8/2007 | Kane ................................ | 726/24 |

(Continued)

FOREIGN PATENT DOCUMENTS

| GB | 2 371 125 A | 7/2002 |
| GB | 2 400 933 A | 10/2004 |

(Continued)

*Primary Examiner* — Andrew Nalven
*Assistant Examiner* — Khang Do
(74) *Attorney, Agent, or Firm* — Harrington & Smith

(57) ABSTRACT

A method of scanning files for malware on a computer system. The method includes receiving a file to be scanned in the system, and using at least one malware scanning engine to determine whether or not the file possesses properties that are indicative of malware. If it is determined that the file does possess properties that are indicative of malware, then at least one cleanliness scanning engine is used to determine whether or not the file possesses properties that are indicative of a clean file. If it is determined that the file possesses properties that are indicative of a clean file, then a false alarm is signalled.

5 Claims, 1 Drawing Sheet

(56) References Cited

U.S. PATENT DOCUMENTS

| | | | |
|---|---|---|---|
| 2009/0013405 A1 | 1/2009 | Schipka | 726/22 |
| 2009/0044024 A1 | 2/2009 | Oberheide et al. | 713/188 |
| 2009/0126012 A1 | 5/2009 | Treadwell et al. | 726/22 |

FOREIGN PATENT DOCUMENTS

| | | |
|---|---|---|
| GB | 2 436 161 A | 9/2007 |
| WO | WO 2004/021197 A1 | 3/2004 |
| WO | WO 2007/087141 A1 | 8/2007 |

* cited by examiner

FALSE ALARM DETECTION FOR MALWARE SCANNING

TECHNICAL FIELD

The present invention relates to the detection of false alarms in malware scanning systems, and in particular, though not necessarily, to the detection of false alarms in automated malware scanning systems.

BACKGROUND

The term "malware" is short for malicious software and is used as a term to refer to any software designed to infiltrate or damage a computer system without the owner's informed consent. Malware can include viruses, worms, trojan horses, rootkits, adware, spyware and any other malicious and unwanted software. Any computer device, such as a desktop personal computer (PC), laptop, personal data assistant (PDA) or mobile phone, can be at risk from malware.

When a device is infected by malware the user will often notice unwanted behaviour and degradation of system performance as the infection can create unwanted processor activity, memory usage, and network traffic. This can also cause stability issues leading to application or system-wide crashes. The user of an infected device may incorrectly assume that poor performance is a result of software flaws or hardware problems, taking inappropriate remedial action, when the actual cause is a malware infection of which they are unaware.

Detecting malware is challenging as the malware authors design their software to be difficult to detect, often employing technology that deliberately hides the presence of malware on a system, i.e. the malware application may not show up on the operating system tables that list currently running processes.

Computer devices make use of anti-virus software to detect and possibly remove malware. This anti-virus software can make use of various methods to detect malware including scanning, integrity checking and heuristic analysis. Of these methods, malware scanning involves the anti-virus software examining files for a virus fingerprint or "signature" that is characteristic of an individual malware program. Typically, this requires that the anti-virus software has a database containing the signatures. When the provider of the anti-virus software identifies a new malware threat, the threat is analysed and its signature is extracted. The malware is then "known" and its signature can be supplied as updates to the anti-virus software database.

In order to detect malware and generate signatures for distribution to client terminals, a "back-end" operation of a malware detection application provider will process large numbers of files and code samples, applying significantly more computational effort than is available at the client terminals. In some cases, this may involve a manual analysis of files and code samples at the back-end. Of course, a goal of the application providers is to automate the malware backend detection process as much as possible, whilst at the same time minimising the risk of false alarms.

SUMMARY

It is an object of the present invention to provide a false alarm detection process for an automated, or at least partially automated, malware detection scheme. This object is achieved by screening samples suspected to be, or to contain, malware to determine an extent to which they possess properties, or exhibit behaviour, characteristic of clean files and code.

According to a first aspect of the present invention there is provided a method of scanning files for malware on a computer system. The method comprises receiving a file to be scanned in the system, and using at least one malware scanning engine to determine whether or not the file possesses properties that are indicative of malware. If it is determined that the file does possess properties that are indicative of malware, then at least one cleanliness scanning engine is used to determine whether or not the file possesses properties that are indicative of a clean file. If it is determined that the file possesses properties that are indicative of a clean file, then a false alarm is signalled.

The invention makes it possible to reduce the need for manual intervention in a malware detection process, whilst at the same time alerting a service provider and/or user to potential false alarms. In the case of the service provider, the invention allows the provider to distribute a more reliable product or service.

The computer system of the invention may be a server or set of servers, e.g. operated by the provider of a malware detection service. Alternatively, the computer system may be a client computer, e.g. owned by an end user.

Considering further the step of using at least one cleanliness scanning engine to determine whether or not the file possesses properties that are indicative of a clean file, this may comprise one or more of:

determining whether or not the file contains code that makes Application Programming Interface calls;

determining whether or not the file contains graphics and/or sound data; determining whether or not the file contains text data in multiple human comprehensible languages;

determining whether or not the file contains clear text strings;

determining an age for which the file has been known to the system without it being identified as malware.

Of course, other criteria may be defined.

The step of using at least one cleanliness scanning engine to determine whether or not the file possesses properties that are indicative of a clean file may comprise generating a measure of the cleanliness of the file and comparing that against a predefined threshold.

According to a second aspect of the present invention there is provided a method of providing a malware scanning service to a multiplicity of client computers, the method comprising:

carrying out the method of the above first aspect of the invention at a backend server or set of servers;

for files for which false alarms are signalled, performing a further automatic and or manual check to confirm whether or not the file is malware; and for each file that is confirmed as malware and for each file that possesses properties that are indicative of malware but does possess properties that are indicative of a clean file, generating a scanning signature and or scanning rule and distributing this/these to the client computers.

According to a third aspect of the present invention there is provided computer system comprising an input for receiving a file to be scanned, and a first processor configured to use at least one malware scanning engine to determine whether or not the file possesses properties that are indicative of malware. The system further comprises a second processor configured to use at least one cleanliness scanning engine to determine whether or not the file possesses properties that are indicative of a clean file if it is determined that the file does possess properties that are indicative of malware, and to signal a false alarm if it is determined that the file possesses properties that are indicative of a clean file.

According to a fourth aspect of the present invention there is provided computer program for causing a computer to carry out the following steps:
- receive a file to be scanned in the system;
- use at least one malware scanning engine to determine whether or not the file possesses properties that are indicative of malware;
- if it is determined that the file does possess properties that are indicative of malware, to use at least one cleanliness scanning engine to determine whether or not the file possesses properties that are indicative of a clean file; and
- if it is determined that the file possesses properties that are indicative of a clean file, to signal a false alarm.

According to a fifth aspect of the present invention there is provided computer program storage medium storing a program according to the above third aspect.

DETAILED DESCRIPTION

Figure 1:
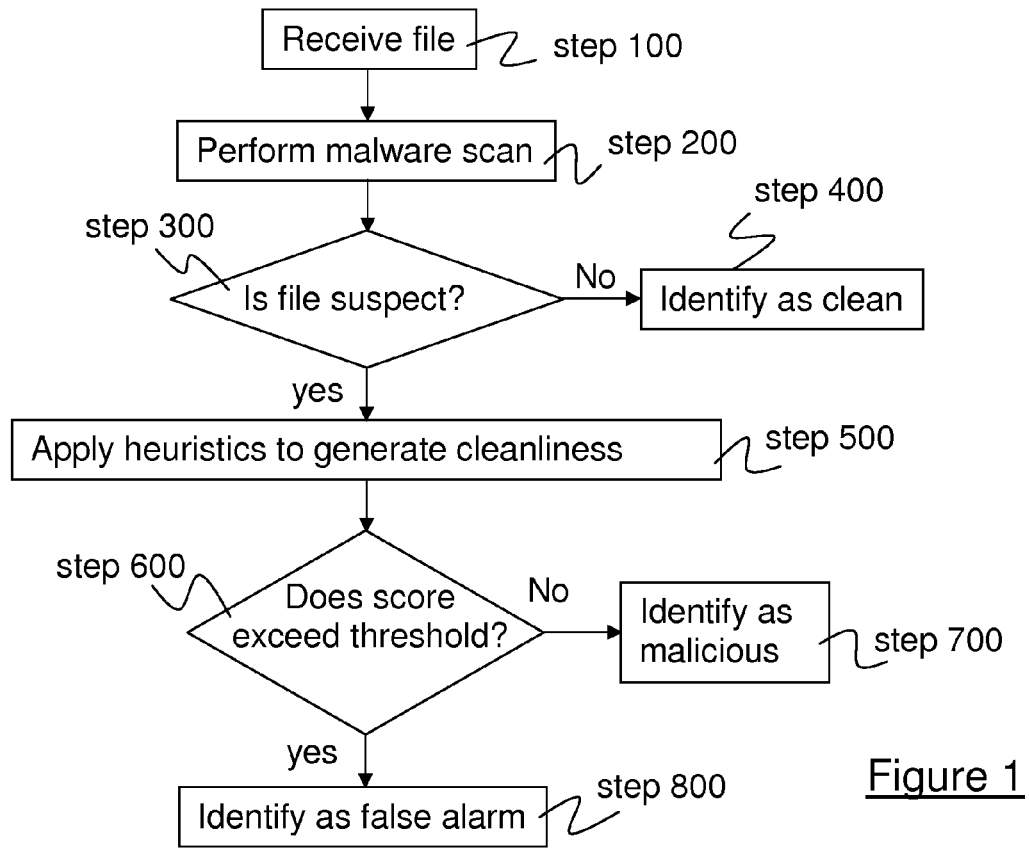
FIG. 1 is a flow diagram illustrating a process for detecting suspected malware and for subsequently identifying false alarms.

A typical back-end detection process carried out by a provider of malware detection application receives and analyses hundreds or even thousands of software files (including complete applications and code samples) every day. These files may be obtained for example by spiders searchers the world wide web, or may be delivered to the backend from client terminals running the providers detection applications. The task of the back-end operation is to rapidly detect new malware that is in the "wild", to generate a signature for that malware and distribute it to client terminals, and, if possible, generate and distribute a disinfection mechanism. It is desirable to automate these processes as much as possible.

Considering the malware detection process, when a new file is received at the backend, servers running there will take the file and determine a) whether it contains known malware and/or b) whether it exhibits behaviour or has properties that are suspicious, i.e. typical of malware. The first of these steps a) is relatively easy to automate by analysing the file to determine if it contains a signature of known malware. The second step b) can also be automated by applying rules or "heuristics" that have been generated through experience gained by analysing large numbers of known viruses. Step b) is however at risk of generating false alarms as some clean files will inevitably produce a positive result to the application of one or more heuristics. If client terminals are advised that a clean file is suspected of being malware, this will give rise to a number of undesirable consequences, including customer frustration and dissatisfaction with the scanning application and an increased requirement for technical support from the application provider.

It is proposed here to seek to detect false alarms resulting from an automated scan of files for malware by performing a further scan on suspect files to determine a "cleanliness" score for each file. If the cleanliness score for a suspect indicates that the file may be clean, some further action is taken in respect of the file to confirm, one way or the other, whether the file is really infected. For example almost no malware samples use advanced graphics or sound libraries, so if file contains a lot of graphics and sound code it is very unlikely to be malware. A high cleanliness score may be determined for such a file.

A cleanliness score can be determined by analysing one or more of the following file properties:
Code Analysis;
    Clean code has code patterns that differ significantly from those of infected files. For example, clean applications typically do not do file write operations without user interaction. Also, in general, clean files have a lot more UI operations per code line than malicious files
API call Frequencies;
    Clean applications usually contain statistical patterns of function calls that differ from those of clean files. For example in clean applications there tends to be significantly more UI code. Also, malicious applications tend to contain a high number of other operations than clean files
Function call Graphs;
    As stated for code analysis above, the functions and order of functions called by clean applications tend to differ from those called by malicious applications. For example, clean applications rarely send information out from device before any UI calls. The same is true for file operations or registry modifications.
String and Resource Analysis;
    Malicious applications are almost always "packed" and thus they do not have significant amount of cleartext strings. Similarly the resources used by malicious applications (if any) are likely to be obfuscated.
Sample clean age, i.e. how long has a file been known to the provider without it causing problems;
localisation/regionalisation. Very few malware files support multiple languages for example.
Geographical/user profile distribution patterns. Malware and clean files may have radically different geographical and user profile distributions.
Google™ hits and number of software reviews;
    Usually for all clean applications Google™ "knows" quite a lot about the software. For example, a clean commercial application is likely to have several software reviews, and a clean freeware application is likely to be available from several download locations.
number of download locations;
    See Google™ reviews.
documentation.
    Malicious applications are very unlikely to contain "documentation". So a simple check for the presence of CHM format documentation may prove useful.
A measure of a files cleanliness may also be determined by looking at the number of end users reporting that file as infected. An unusually high number of such reports may indicate that the file is clean and in widespread use.

A score may be allocated for each heuristic used, and the results combined, possibly using some statistical weighting, to determine an overall cleanliness score.

FIG. 1 is a flow diagram illustrating a procedure for detecting malware in software files. Upon receipt of a file at the back-end scanning server, step 100, the server performs at step 200 the "conventional" malware scan using, typically, a plurality of malware scanning engines to ensure maximum detection rates. Assuming a fully automated system, files that are not suspected of being malware at step 300 as a result of the scan are identified as clean at step 400. Files that are identified as suspect at step 300 are then subjected to a further scan at step 500 in order to generate a cleanliness score. The score is compared at step 600 against some predefined threshold. If the score for the file is below the threshold, the file is identified as malicious at step 700 (and appropriate action taken such as generating and distributing file signatures to client terminals). If, on the other hand, the cleanliness score exceeds the threshold, the file is identified at step 800 as a false alarm. This may trigger further automated processes and/or a manual intervention.

Whilst it is expected that the false alarm detection mechanism proposed here will be implemented in the back-end operation of a malware detection application provider, it is of course possible to additionally, or even alternatively, implement it at the client front-ends, i.e. to implement the mechanism in the software products that are provided to customers/subscribers. In this case, the detection of a possible false alarm may result in one or more of the following actions: 1) a file being passed as clean (only if the mechanism is sufficiently trusted); 2) an alert being presented to the user; and 3) details of the false alarm being passed to the provider's back-end. Action 3) may involve quarantining the file at the client terminal until such time as the back-end has performed a further analysis on the file and a result returned to the client terminal.

Figure 2:
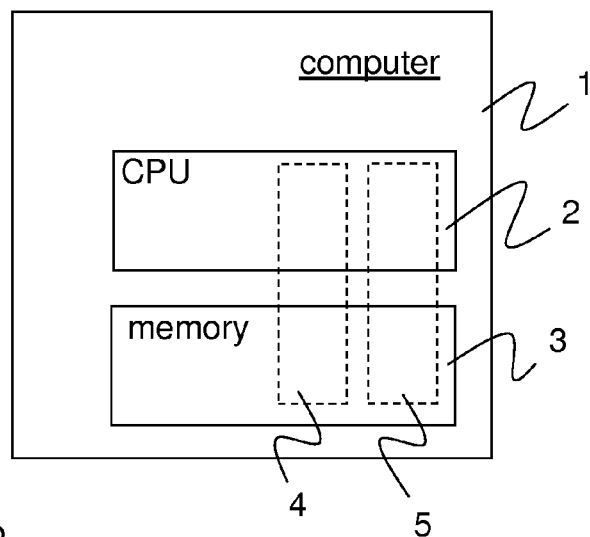
FIG. 2 illustrates schematically a computer for detecting suspected malware and for subsequently identifying false alarms.

FIG. 2 illustrates schematically a computer 1 configured to implement the malware false alarm detection mechanism described above. In this example, the computer also performs the initial malware scan, although it will be appreciated that this need not be the case. The computer may be a back-end server, or a client terminal such as a pc, laptop, PDA, or mobile phone. It comprises one or more central processing units (CPUs) and associated hardware 2, as well as memory 3 for storing software instructions, files to be scanned, and associated data. The software instructions perform at least the two main functions described above, that is the malware scanning function 4 and the cleanliness scan and handling function 5.

It will be appreciated by the person of skill in the art that various modifications may be made to the above described embodiments without departing from the scope of the present invention.

The invention claimed is:

1. A method of providing a malware scanning service to a multiplicity of client computers, the method comprising at a backend server or set of servers performing the steps of:
   receiving files to be scanned and for each file
   using at least one malware scanning engine to determine whether or not the file possesses properties that are indicative of malware,
   if it is determined that the file does possess properties that are indicative of malware, then using at least one cleanliness scanning engine to determine, using one or more heuristics, whether or not the file possesses properties that are indicative of a clean file,
   if it is determined that the file possesses properties that are indicative of a clean file, then signaling a false alarm;
   for files for which false alarms are signaled, performing a further automatic and/or manual check to confirm whether or not the file is malware; and
   for each file that is confirmed as malware and for each file that possesses properties that are indicative of malware but does possess properties that are indicative of a clean file, generating a scanning signature and/or scanning rule and distributing this/these to the client computers.

2. A method according to claim 1, wherein said step of using at least one cleanliness scanning engine to determine whether or not the file possesses properties that are indicative of a clean file comprises one or more of:
   determining whether or not the file contains code that makes Application Programming Interface calls;
   determining whether or not the file contains graphics and/or sound data;
   determining whether or not the file contains text data in multiple human comprehensible languages;
   determining whether or not the file contains clear text strings;
   determining an age for which the file has been known to the system without it being identified as malware.

3. A method according to claim 1, wherein said step of using at least one cleanliness scanning engine to determine whether or not the file possesses properties that are indicative of a clean file comprises generating a measure of the cleanliness of the file and comparing that against a predefined threshold.

4. A backend computer system for providing a malware scanning service to a multiplicity of client computers, the system comprising:
   an input for receiving files to be scanned;
   a first processor configured to use at least one malware scanning engine to determine whether or not at least one of the files possesses properties that are indicative of malware;
   a second processor configured to use at least one cleanliness scanning engine to determine, using one or more heuristics, whether or not at least one of the files possesses properties that are indicative of a clean file if it is determined that the file does possess properties that are indicative of malware, and to signal a false alarm if it is determined that the file possesses properties that are indicative of a clean file;
   a third processor configured, for files for which false alarms are signaled, to perform a further automatic and/or manual check to confirm whether or not the file is malware;
   a fourth processor configured, for each file that is confirmed as malware and for each file that possesses properties that are indicative of malware but does possess properties that are indicative of a clean file, to generate a scanning signature and/or scanning rule; and
   an output for distributing the scanning signature and/or scanning rule to the client computers.

5. A non-transitory computer program storage medium storing a program according to claim 4.

* * * * *